United States Patent [19]

Kondo

[11] Patent Number: 4,710,811
[45] Date of Patent: Dec. 1, 1987

[54] HIGHLY EFFICIENT CODING APPARATUS FOR A DIGITAL VIDEO SIGNAL

[75] Inventor: Tetsujiro Kondo, Kanagawa, Japan

[73] Assignee: Sony Corporation, Tokyo, Japan

[21] Appl. No.: 809,742

[22] Filed: Dec. 17, 1985

[30] Foreign Application Priority Data

Dec. 21, 1984 [JP] Japan .............................. 59-269866

[51] Int. Cl.$^4$ ..................... H04N 7/12; H04N 1/40
[52] U.S. Cl. .................................. 358/135; 358/138; 358/260
[58] Field of Search ............... 358/135, 136, 138, 260, 358/280

[56] References Cited

U.S. PATENT DOCUMENTS 4,455,571 6/1984 Shimuzu et al. ................. 358/138
4,547,811 10/1985 Ochi et al. ...................... 358/282 X Primary Examiner—E. A. Goldberg
Assistant Examiner—Patrick W. Foster
Attorney, Agent, or Firm—Lewis H. Eslinger; Alvin Sinderbrand

[57] ABSTRACT

In an apparatus for coding digital video data in the form of block of data, the dynamic range information is generated from maximum and minimum values of plural picture elements in a block, the minimum value is subtracted from each of the digital data to generate modified digital video data, the modified digital video data is encoded with a variable digitized bit number determined by the dynamic range information, and the encoded data and an additional code for each block formed of at least two of the maximum value, the minimum value, and a signal representing the dynamic range information are transmitted.

7 Claims, 12 Drawing Figures

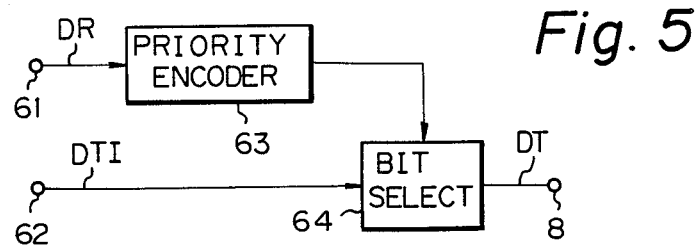
Fig. 5
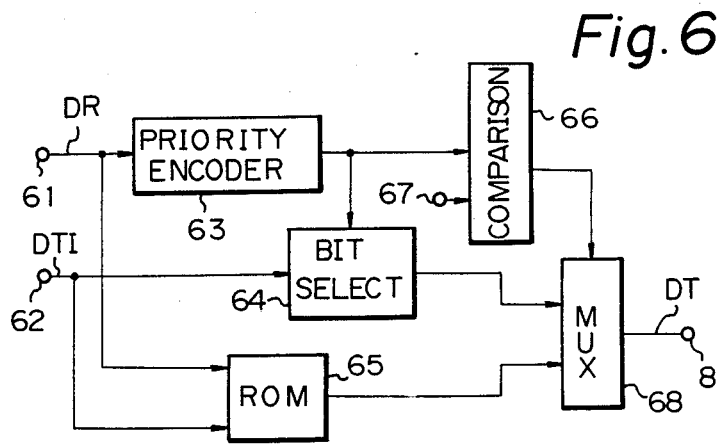
Fig. 6
Fig. 7    Fig. 8
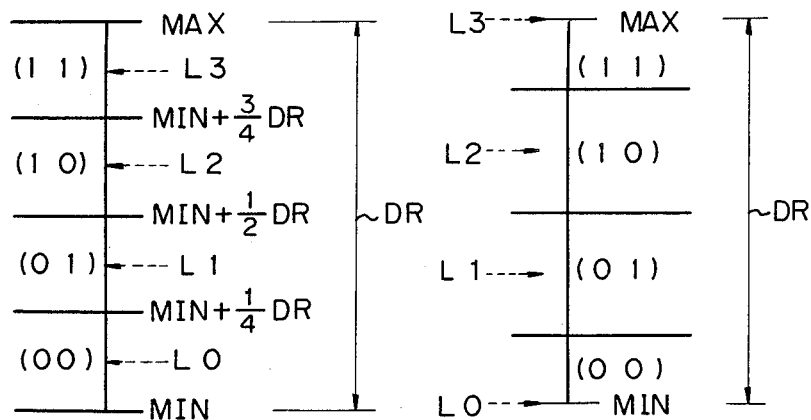

16 PICTURE ELEMENTS

HIGHLY EFFICIENT CODING APPARATUS FOR A DIGITAL VIDEO SIGNAL

BACKGROUND OF THE INVENTION

1. Field of the Invention

The present invention relates to a compression coding apparatus for a digital video signal and, more particularly, to a highly efficient coding apparatus which uses a variable number of bits, depending on the nature of the signal.

2. Description of the Prior Art

There are several known methods which effectively compress the data of the video signal by either directly reducing the number of bits per picture element or reducing sampling frequency with each picture frame.

One known technique reduces the amount of data to ½ its original level by subsampling the image data in each field; that is, alternating picture elements are transmitted for the entire picture field. At the receiver, the value of each non-transmitted picture element is approximately computed by performing an interpolation using the transmitted picture elements. Thus, the effective sampling frequency is reduced by 50%.

Another technique, called DPCM (Differential Pulse Code Modulation), reduces the average number of bits per picture element. This technique takes advantage of the high level of correlation between adjacent picture elements. Basically, since the correlation between picture elements is high, the difference between adjacent picture elements is small. Thus, this difference between adjacent picture elements is transmitted, rather than the actual value of each picture element.

A third technique which reduces the average number of bits per picture element also capitalizes on the high level of correlation between adjacent picture elements. The picture is divided into many blocks. In each block, a representative picture element is selected. Then, for each element in the block, a value corresponding to the deviation of this element's value from the representative vcalue is transmitted.

The technique which uses sub-sampling (every other picture element is transmitted) is highly susceptible to aliasing because the sampling frequency has been effectively reduced by 50%.

In the DPCM method, coding errors tend to have serious consequences for subsequent coding.

The method which divides each picture field into many block has a serious drawback in that block distortion occurs at the boundary between blocks.

OBJECT AND SUMMARY OF THE INVENTION

It is an object of the present invention to provide a highly efficient coding apparatus which avoids the problems of the foregoing conventional technology, such as the occurrence of aliasing distortion, the propagation of coding error, and the occurrence of block distortion.

Another object of the invention is to provide a variable length coding apparatus for a digital video signal in which data delimiter information and complicated controls are unnecessary.

Still another object of the invention is to provide a highly efficient coding apparatus for a digital video signal, employing a variable length coding system in which the recovery error is small and the compressibility is good.

In accordance with this invention, each picture field is divided into a plurality of blocks. Each block is processed separately. First, the block's dynamic range (difference between the maximum and minimum picture element levels within the block) and the minimum level are obtained. The block's dynamic range is now divided into equally spaced levels, and each picture element within the block is assigned to the nearest level. For example, if 3 bits were being used to encode the dynamic range then there would be 8 levels within the dynamic range. In accordance with this invention, the number of bits used to represent each block's dynamic range is variable, depending on the magnitude of the dynamic range. For transmission, the level assigned to a given picture element is transmitted, rather than the original picture element value. Also, for each block, the block's dynamic range and minimum level are transmitted. With this information, each picture element can be reconstructed at the receiver.

Picture elements of a given picture field are highly correlated in both the vertical and horizontal directions. Thus, in non-motion areas of the picture, the dynamic range is small. Therefore, by digitizing the picture elements using the afore mentioned technique, the average number of bits can be significantly reduced. Thus, the transmission bandwidth can also be reduced. Moreover, even in the case of the variable length coding system, by transmitting the additional codes of every block (Dynamic Range and Minimum picture element level) there is no need to insert any special delimiter into the data. Thus, compressibility can be improved and control can be simplified. The invention will be apparent by reference to the accompanying drawings.

BRIEF DESCRIPTION OF THE DRAWINGS

FIG. 5 is a block diagram of an example of an encoder block;

FIG. 6 is a block diagram showing another example of an encoder block;

FIG. 7 is a block diagram for explaining a coding method of an encoder block;

FIG. 8 is a schematic diagram for explaining another coding method of an encoder block.

DETAILED DESCRIPTION OF THE PREFERRED EMBODIMENTS

Figure 1:
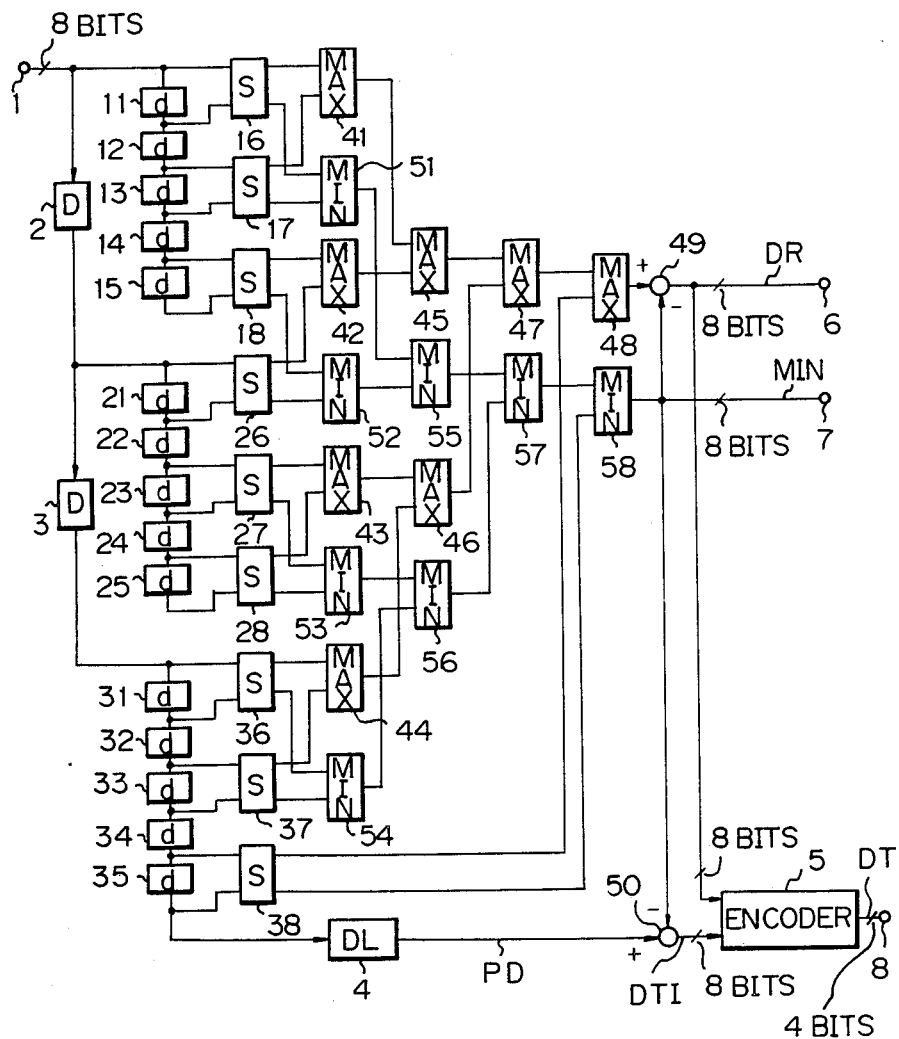
FIG. 1 is a block diagram of an embodiment of the present invention.

An embodiment of the present invention will now be described hereinbelow with reference to the drawings. FIG. 1 is a diagram showing the entire arrangement of an encoder of an embodiment of the invention. A digital video signal of the NTSC system comprised of, for example, 8 bits per sample is inputted to an input terminal 1. This digital video signal is supplied to a cascade connection of line delay circuits 2 and 3 and a cascade connection of five sample delay circuits 11 to 15.

A cascade connection of five sample delay circuits 21 to 25 is connected to the connecting point of the line delay circuits 2 and 3. A cascade connection of five sample delay circuits 31 to 35 is connected to the output terminal of the line delay circuit 3. The picture element data of one block can be simultaneously obtained from output terminals of the respective delay circuits due to the line delay circuits 2 and 3 each having a delay amount of one line period and the sample delay circuits 11 to 15, 21 to 25, and 31 to 35 each having a delay amount equal to the sampling period of the input digital video signal.

Figure 2:
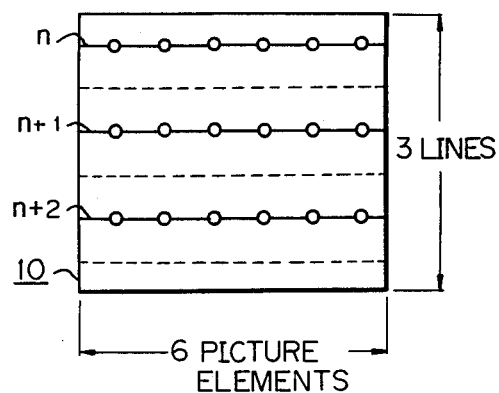
FIG. 2 is a schematic diagram for explaining a block which is a unit for a coding process.

In FIG. 2, reference numeral 10 denotes one block, solid lines indicate the continuous n-th, (n+1)-th, and (n+2)-th lines of the current field, and broken lines represent the lines of the other field. One block consists of 3 lines. Each line contains 6 picture elements. When the picture element data of the (n+2)-th line is supplied to the input terminal 1, the picture element data of the (n+1)-th line is generated at an output of the line delay circuit 2 and the picture element data of the n-th line is generated at an output of the line delay circuit 3. Six picture element data from each line are accessed at the input and output terminals of each cascade connection of the sample delay circuits, as well as between each of the delay circuits.

Two of the six picture element data of the same line taken out by the cascade connection of the sample delay circuit 11 to 15 are supplied to each of the three selecting circuits 16, 17, and 18. Similarly, selecting circuits 26, 27, and 28 are each supplied with two picture element data from sample delay circuits 21 to 25. As well, selecting circuits 36, 37, and 38 are each supplied with two picture element data from sample delay circuits 31 to 35. These selecting circuits are digital level comparators which are configured to compare the levels of two input picture element data and output the picture element data of larger magnitude at one output terminal and output the picture element data of smaller magnitude at the other output terminal.

One output terminal of each of the selecting circuits 16 and 17 is connected to input terminals of a selecting circuit 41. The other output terminals of the selecting circuits 16 and 17 are connected to input terminals of a selecting circuit 51. One output terminal of each of the selecting circuits 18 and 26 is connected to input terminals of a selecting circuit 42 and the other output terminals of the selecting circuits 18 and 26 are connected to input terminals of a selecting circuit 52. One output terminal of each of the selecting circuits 27 and 28 is connected to input terminals of a selecting circuit 43 and the other output terminals of the selecting circuits 27 and 28 are connected to input terminals of a selecting circuit 53. One output terminal of each of the selecting circuits 36 and 37 is connected to input terminals of a selecting circuit 44 and the other output terminals of the selecting circuits 36 and 37 are connected to input terminals of a selecting circuit 54.

The selecting circuits 41 to 44 are digital level comparators which are configured to compare the levels of two input picture element data and selectively output only the picture element data of larger magnitude. The selecting circuits 51 to 54 are digital level comparator which are configured to compare the levels of two input picture element data and selectively output only the picture element data of smaller magnitude.

The outputs of the selecting circuits 41 and 42 are supplied to a selecting circuit 45. The outputs of the selecting circuits 43 and 44 are supplied to a selecting circuit 46. The outputs of the selecting circuits 45 and 46 are supplied to a selecting circuit 47. The output of the selecting circuit 47 and the output of the larger level of the selecting circuit 38 are supplied to a selecting circuit 48. The selecting circuits 45 to 48 selectively output the picture element data of larger magnitude, similar to the selecting circuits 41 to 44. Therefore, the picture element data of the maximum level MAX among eighteen picture element data in the block 10 is generated at an output terminal of the selecting circuit 48.

The outputs of the selecting circuits 51 and 52 are supplied to a selecting circuit 55. The outputs of the selecting circuits 53 and 54 are supplied to a selecting circuit 56. The outputs of the selecting circuits 55 and 56 are supplied to a selecting circuit 57. The output of the selecting circuit 57 and the output of the smaller level of the selecting circuit 38 are supplied to a selecting circuit 58. The selecting circuits 55 to 58 selectively output the picture element data of the smaller magnitude, similar to the selecting circuits 55 to 58 selectively output the picture element data of the smaller magnitude, similar to the selecting circuits 51 to 54. Therefore, the picture element data of the minimum level MIN among eighteen picture element data in the block 10 is generated at an output terminal of the selecting circuit 58.

The outputs of the selecting circuits 48 and 58 are supplied to substracter 49. The substracter 49 substracts the minimum level MIN from the maximum level MAX, so that the dynamic range DR of eight bits is obtained at an output terminal 6. The minimum level MIN is taken out at an output terminal 7 and also supplied to a subtracter 50.

The picture element data PD generated at the output of the sample delay circuit 35 is supplied to the subtracter 50 through a delay circuit 4. The delay circuit 4 has a delay amount which is equal to the time lag which is caused by the detection of the maximum level MAX and the minimum level MIN in the manner as described above. The picture element data DTI of eight bits from which the minimum level was removed is derived at an output of the subtracter 50.

The dynamic range DR and the picture element data DTI (after the removal of the minimum level) are supplied to asn encoder block 5. The encoder block 5 determines the number of digitized bits in accordance with the dynamic range DR. The dynamic range is then divided into equal parts according to the number of digitized bits. The encoder now determines into which of the divided areas the picture element data DTI (after removal of the minimum level) is included, and a code DT is generated an output terminal 8. A practical configuration of encoder blocks will be explained later.

As described above, the dynamic range DR and the minimum level MIN as additional data are obtained at the output terminals 6 and 7 of the encoder shown in FIG. 1 and the coded code DT is derived at the output terminal 8. Although not shown, a buffer memory is connected to an output of the encoder and the additional data DR and MIN and the coded code DT of one block are transmitted for every block. The code DT and the additional data DR and MIN are subjected to a process of error correction coding and transmitted as serial data (or recorded on a recording medium).

Figure 3A:
FIGS. 3A to 3C are schematic diagrams for explaining three examples of arrangements of transmission data.
Figure 3B:
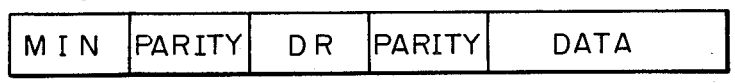
Figure 3C:

FIGS. 3A to 3C show three examples of formats for the transmission data. FIG. 3A shows the case where the data portions consisting of the minimum level MIN, dynamic range DR, and code DT are respectively subjected to the process of the independent error correction codes and the parities of the respective error correction codes are added to those data portions and then transmitted. The length of the data portion consisting of the code DT is equal to (m bits × 16) (m is the number of digitized bits which is detemined by the dynamic range DR of that block). FIG. 3B shows the case where only the minimum level MIN and dynamic range DR are respectively subjected to the processes of the independent error correction codes and the parities of the respective error correction codes are added to them. FIG. 3C shows the case where both of the minimum level MIN and the dynamic range DR are subjected to the process of the common error correction code and the parity of this error correction code is added to them.

As is apparent from FIGS. 3A to 3C, the additional codes are interposed for every block and the resultant serial data is transmitted. Therefore, there is no need to insert any particular code as a delimiter for the block.

Figure 4:
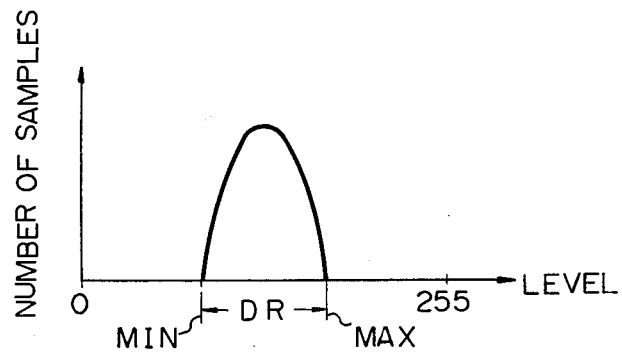
FIG. 4 is a schematic diagram for explaining a level distribution of picture element data in one block.

As shown in FIG. 4, a total of 256 (0 to 255) kinds of levels can be presented for the digital video signal when the number of digitized bits is eight. However, in the non-motion portion of the picture excluding the non-stationary portion such as a contour of an object, the distribution of the levels of the picture elements of one block is concentrated in a fairly narrow range as shown in FIG. 4. Therefore, even if the number of digitized bits is variable within a range (from one to eight bits), in most cases, the number of digitized bits required is seven bits or less, so the average number of bits per one picture element can be reduced.

The encoder block 5 generates the coded code DT in which the number of digitized bits is variable within a range from one to eight bits in accordance with the dynamic range DR from the subtracter 49.

FIG. 5 shows one possible configuration of the encoder block 5. In FIG. 5, the dynamic range DR of eight bits is supplied from an input terminal 61 to a priority encoder 63. The picture element data DTI of eight bits (after the removal of the minimum level MIN) is supplied from an input terminal 62 to a bit selecting circuit 64. The priority encoder 63 generates outputs $C_2$, $C_1$, and $C_0$. These 3 bits indicate the highest (most-significant) bit position of the dynamic range input containing a "1".

Basically, the highest (most significant) bit position of the dynamic range indicates the value of the dynamic range. For example, when the MSB (most significant bit) of the dynamic range DR is set to "1", the dynamic range lies within a range from 128 to 255. When the LSB (least significant bit) of the dynamic range is the highest order where "1" is set, the dynamic range DR lies within a range from 0 to 1.

The bit selecting circuit 64 selects a predetermined number of bits starting from the LSB of the data DTI and outputs these bits in accordance with the outputs ($C_2$, $C_1$, $C_0$) of the priority encoder 63. Assuming that eight bits of the data DTI are $X_7$, $X_6$, $X_5$, $X_4$, $X_3$, $X_2$, $X_1$, $X_0$, where $X_7$ is the MSB, the outputs of the bit selecting circuit 64 of one to eight bits are generated as the code DT as shown in the following table.

| DR | $C_2$ | $C_1$ | $C_0$ | Coded code DT | | | | | | | |
|---|---|---|---|---|---|---|---|---|---|---|---|
| 0–1     | 1 | 1 | 1 |   |   |   |   |   |   |   | $X_0$ |
| 2–3     | 1 | 1 | 0 |   |   |   |   |   |   | $X_1$ | $X_0$ |
| 4–7     | 1 | 0 | 1 |   |   |   |   |   | $X_2$ | $X_1$ | $X_0$ |
| 8–15    | 1 | 0 | 0 |   |   |   |   | $X_3$ | $X_2$ | $X_1$ | $X_0$ |
| 16–31   | 0 | 1 | 1 |   |   |   | $X_4$ | $X_3$ | $X_2$ | $X_1$ | $X_0$ |
| 32–63   | 0 | 1 | 0 |   |   | $X_5$ | $X_4$ | $X_3$ | $X_2$ | $X_1$ | $X_0$ |
| 64–127  | 0 | 0 | 1 |   | $X_6$ | $X_5$ | $X_4$ | $X_3$ | $X_2$ | $X_1$ | $X_0$ |
| 128–255 |   |   |   | $X_7$ | $X_6$ | $X_5$ | $X_4$ | $X_3$ | $X_2$ | $X_1$ | $X_0$ |

Since the correlation among the picture elements in one block is high (as mentioned above), the dynamic range DR of each block becomes less than (64–127) in the most cases. Thus, the quantity of transmission data can be reduced. Further, by transmitting the three-bit output ($C_2$, $C_1$, $C_0$) of the priority encoder 63 without transmitting the eight-bit dynamic range DR itself, an even higher level of compressibility can be realized.

The above-mentioned encoder block is a reversible coding system which can completely eliminate recovery error. However, it may be possible to adopt a convention in which an error of such a degree that cannot be visually perceived (for example, an error of up to two bits of the LSB) is permitted. In other words, the two lowest order bits are omitted and the code DT of a length less than six bits may be formed. In this case, the relation between the dynamic range DR and the code DT is as shown in the following table.

| DR | $C_2$ | $C_1$ | $C_0$ | Coded code DT | | | | | |
|---|---|---|---|---|---|---|---|---|---|
| 0–1     | 1 | 1 | 1 |   |   |   |   |   | 0 |
| 2–3     | 1 | 1 | 0 |   |   |   |   |   | 0 |
| 4–7     | 1 | 0 | 1 |   |   |   |   |   | $X_2$ |
| 8–15    | 1 | 0 | 0 |   |   |   |   | $X_3$ | $X_2$ |
| 16–31   | 0 | 1 | 1 |   |   |   | $X_4$ | $X_3$ | $X_2$ |
| 32–63   | 0 | 1 | 0 |   |   | $X_5$ | $X_4$ | $X_3$ | $X_2$ |
| 64–127  | 0 | 0 | 1 |   | $X_6$ | $X_5$ | $X_4$ | $X_3$ | $X_2$ |
| 128–255 | 0 | 0 | 0 | $X_7$ | $X_6$ | $X_5$ | $X_4$ | $X_3$ | $X_2$ |

FIG. 6 shows another configuration of the encoder block 5. According to the configuration shown in FIG. 6, the code DT is suppressed to four bits or less, thereby further increasing the compressibility.

In FIG. 6, the priority encoder 63 and bit selecting circuit 64 generate the coded codes in which the number of digitized bits is variable in accordance with the dynamic range DR similarly to the encoder block shown in FIG. 5. The 3 bits output from the priority encoder 63 are supplied to one input terminal of a digital comparator 66. Data of three bits (0 1 1) is supplied from a terminal 67 to the other input terminal of the comparator 66. A multiplexer 68 is controlled by an output of the comparator 66. The code DT is taken out at the output terminal 8 of the multiplexer 68.

The output of the bit selecting circuit 64 and an output of a ROM 65 (in which a data table to compress the number of digitized bits is stored) are supplied to the multiplexer 68. The multiplexer 68 selects one the other of the inputs thereto as the code DT in response to the output of the comparator 66. Namely, when the output codes ($C_2$, $C_1$, $C_0$) of the priority encoder 63 are either of (1 1 1), (1 1 0), (1 0 1), and (1 0 0), the output of the bit selecting circuit 64 is selected by the multiplexer 68. When the output codes of the priority encoder 63 are either of (0 1 1), (0 1 0), (0 0 1), and (0 0 0), the output of the ROM 65 is selected by the multiplexer 68.

The ROM 65 divides the dynamic range DR into sixteen (=$2^4$) equal level ranges and determines in which level range the data DTI is included and the code of four bits corresponding to the level range decided is read out from the ROM 65.

The encoding operation of the ROM 65 will now be described. It is assumed that the number of digitized bits is set to two instead of four and the dynamic range is divided into four equal parts to help simplify the explanation.

As shown in FIG. 7, the picture element data PD (including the minimum level) in one block falls within the dynamic range DR extending from the minimum level MIN to the maximumlevel MAX. One of four level ranges is selected by dividing the dynamic range DR into four equal parts. The ROM 65 outputs a two-bit code in accordance with the level range selected.

The ROM 65 divides the dynamic range into equal parts based on the number of digitized bits, and uses the central values $L_2$, $L_2$, and $L_3$ of the respective areas as values when deconding. Using this coding method, the digitization distortion can be reduced. However, the picture element data having the minimum level MIN and the maximum level MAX exist in each block. Therefore, as shown in FIG. 8, to increase the number of codes having no error, the dynamic range DR is divided into ($2^m-1$) (where, m is he number of digitized bits) equal parts. In this way, the minimum level MIN may be set to the representative level $L^0$ and the maximum level MAX may be set to the representative level $L^3$.

The output of the bit selecting circuit 64 is determined according to the reversible coding system, which can completely eliminate the recovery error. The output of the ROM 65 is determined according to the non-reversible coding system. However, the digitization distortion is four bits in the worst case where the dynamic range DR lies within a range of 128 to 255. This distortion will hardly cause a problem from the standpoint of visual picture quality. In place of the ROM 65, a level comparator or a divider may be used.

According to the configuration in which the coded data is decoded as mentioned above, the dynamic range DR is identified by the dynamic range information, namely, by the three bit output of the priority encoder 63. Switching is performed between the decoder corresponding to the bit selecting circuit 64 and the decoder corresponding to the ROM 65 as a result of this identification.

In the above description, a total of three data, consisting of the code DT, the information of the dynamic range DR, and the minimum level MIN, are transmitted. However, the minimum level MIN and the maximum level MAX, or the information of the dynamic range DR and the minimum level MIN may be transmitted as additional codes.

Further, the present invention can also be applied to the case of a one-dimensional block. As shown in FIG. 10, one block may be constituted by, e.g., sixteen continuous picture elements of the same line. An encoder for the case of a one-dimensional block will be described with reference to FIG. 9.

Figure 9:
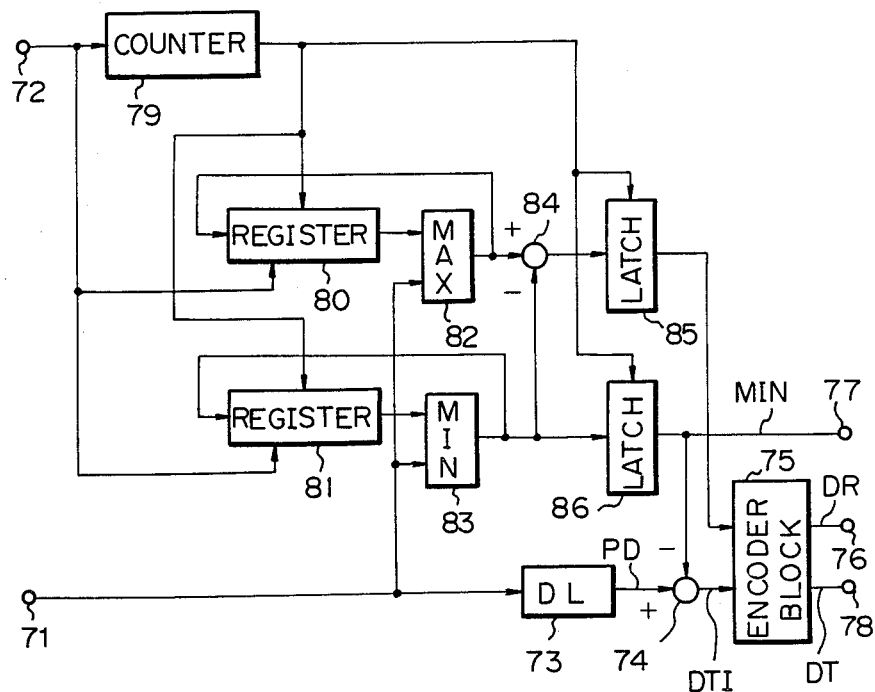
FIGS. 9 and 10 are a block diagram and a schematic diagram for explaining another example of an encoder to which the invention can be applied.
Figure 10:
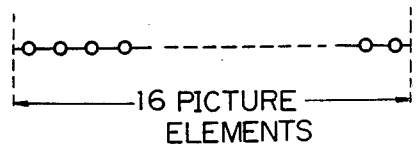

In FIG. 9, an eight-bit digital video signal is inputted in parallel to an input terminal 71. The input digital video signal is supplied to a subtractor 74 through a delay circuit 73.

A sampling clock synchronized with the input digital video signal is supplied to an input terminal 72. This sampling clock is supplied as a clock pulse to a counter 79 and registers 80 and 81. The counter 79 is a hexadecimal counter and a block clock signal is generated as its output for every sixteen picture element data. This block clock is supplied to the registers 80 and 81 as a pulse for initialization and also to latches 85 and 86 as a latch pulse.

Registers 80 and 81 can input and output 8-bit parallel data. The output data of register 80 is supplied to one input terminal of a selecting circuit 82, and the output data of register 81 is supplied to one input terminal of a selecting circuit 83. The input digital video signal is supplied to the other input terminals of the selecting circuits 82 and 83.

The selecting circuit 82 is a digital level comparator configured to selectively output the larger level of the two input data. The selecting circuit 83 is a digital level comparator configured to selectively output the smaller level of the two input data. The output data of the selecting circuit 82 is supplied to one input terminal of a subtractor 84 and to the input terminal of register 80. The output data of the selecting circuit 83 is supplied to the other input terminal of the subtractor 84 and to the input terminal of register 81.

In this example, as shown in FIG. 10, one block is comprised of sixteen continuous picture element data of the same line. The block clock from the counter 79 is generated at the lead portion of each block to initialize registers 80 and 81. All bits of register 80 are initialized to "0". All bits of register 81 are initialized to "1".

The first picture element data of one block is selected by the selecting circuits 82 and 83 and stored into the registers 80 and 81. The next picture element data is compared with the picture element data stored in the registers 80 and 81, so that the data of the larger level is selected and outputted from the selecting circuit 82. The data of the smaller level is selected and outputted from the selecting circuit 83. In a similar manner, all of the picture element data in one block are sequentially compared. Upon completion of this comparison, the maximum level of these 16 picture elements is selected and outputted at the output terminal of selecting circuit 82. Similarly, the minimum level among these sixteen picture element data is outputted at the output terminal of the selecting circuit 83.

The subtracter 84 substracts the minimum level from the maximum level, so that the dynamic range of the block is supplied at an output terminal of the substracter 84. The dynamic range DR, which is outputted from the substracter 84, is stored into the latch 85. The minimum level MIN, which is outputted from the selecting circuit 83, is stored into the latch 86. The dynamic range DR stored in the latch 85 is supplied to an encoder block 75. The minimum level MIN stored in the latch 86 is outputted at an output terminal 77 and supplied to the other input terminal of the subtracter 74.

The picture element data PD, the timing of which was matched by the delay circuit 73, is supplied to the subtracter 74. Therefore, the data DTI (after the removal of the minimum level MIN) is generated at an output terminal of the subtracter 74. The data DTI is supplied to the encoder block 75. The encoder block 75 is configured in a manner similar to the encoder block 5. The dynamic range DR and the code DT of a variable length are outputted at output terminals 76 and 78 of the encoder block 75.

According to the present invention, the amount of data to be transmitted can be reduced, and the transmission band narrowed, by taking advantage of the correlation among the picture elements in a block. In addition, according to the invention, the number of digitized bits is determine based on the magnitude of the dynamic range, so that a good image of a uniform, low-level distortion is derived. Moreover, in this invention, the additional codes can be used as the delimiter of data, irrespective of a variable length, so that the compressibility can be improved and configurations of the encoder and decoder can be simplified.

The present invention is not limited to the foregoing embodiments but many modifications and variations are possible within the spirit and scope of the appended claims of the invention.

What is claimed is:

1. A highly efficient coding apparatus for coding digital video data in a format composed of blocks of digital video data representing plural picture elements and allowing compression of the video data, comprising:

first and second detecting means for detecting maximum and minimum values, respectively, of the digital video data representing the plural picture elements in each of said blocks;

means for generating dynamic range information for each said block from said maximum and minimum values for the respective block;

means for generating modified digital video data for each said block as the difference between each of the digital video data and one of said maximum and minimum values for said respective block;

means for encoding said modified digital video data with a variable digitized bit number determined by said dynamic range information for said respective block so as to provide coded data of variable bit length; and transmitting means for transmitting the coded data of variable bit length and an additional code for each said respective block formed of at least two of said maximum and minimum values and a signal corresponding to said dynamic range information.

2. A highly efficient coding apparatus according to claim 1, wherein said means for encoding includes a priority encoder supplied with said dynamic range information and being operative to generate encoded data with a smaller number of bits than the number of bits in said dynamic range information and a bit selector supplied with said modified digital video data and being operative for selecting a predetermined number of bits of said modified digital video data, said predetermined number being determined in response to said priority encoder.

3. A highly efficient coding apparatus according to claim 2, wherein said encoded data generated by said priority encoder represents the most significant bit position containing a "1" in said dynamic range information.

4. A highly efficient coding apparatus according to claim 2, wherein said means for encoding further includes a ROM with a data table having data representative of an equally divided range of said dynamic range information, a comparator for comparing the output of said priority encoder with a reference value so as to provide a compared output, and a selector for selecing one of the outputs of said bit selector and said ROM according to the compared output from said comparator.

5. A highly efficient coding apparatus according to claim 1, wherein said transmitting means adds parity data to at least said additional code.

6. A highly efficient coding apparatus according to claim 1, wherein said digital video data in each said block represents a two-dimensional group of said picture elements.

7. A highly efficient coding apparatus according to claim 1, wherein said digital video data in each said block represents a one-dimensional group of said picture elements.

* * * * *